United States Patent
Kuo et al.

(10) Patent No.: US 7,656,074 B2
(45) Date of Patent: Feb. 2, 2010

(54) VOICE COIL MOTOR DEVICE FOR POSITIONING

(75) Inventors: Li-Te Kuo, Jhudong Township, Hsinchu County (TW); Mei-Ling Lai, Taiping (TW); Ko-Chun Chen, Kaohsiung (TW)

(73) Assignee: Wah Hong Industrial Corp., Kaohsiung (TW)

( * ) Notice: Subject to any disclaimer, the term of this patent is extended or adjusted under 35 U.S.C. 154(b) by 0 days.

(21) Appl. No.: 12/099,546

(22) Filed: Apr. 8, 2008

(65) Prior Publication Data

US 2008/0246353 A1 Oct. 9, 2008

(30) Foreign Application Priority Data

Apr. 9, 2007 (TW) .............................. 96112335 A

(51) Int. Cl.
*H01L 41/08* (2006.01)
(52) U.S. Cl. ...................................... 310/330; 310/339
(58) Field of Classification Search ................. 310/328, 310/330–332
See application file for complete search history.

(56) References Cited

U.S. PATENT DOCUMENTS

| | | | | | |
|---|---|---|---|---|---|
| 3,310,983 | A | * | 3/1967 | Boulais et al. | 246/169 A |
| 3,336,529 | A | * | 8/1967 | Tygart | 324/173 |
| 4,814,753 | A | * | 3/1989 | Coppola | 340/689 |
| 6,486,589 | B1 | * | 11/2002 | Dujari et al. | 310/331 |
| 6,903,494 | B2 | * | 6/2005 | Noda | 310/328 |
| 7,049,912 | B2 | * | 5/2006 | Bataille et al. | 335/132 |
| 2004/0195939 | A1 | * | 10/2004 | Noda | 310/328 |

* cited by examiner

*Primary Examiner*—Mark Budd
(74) *Attorney, Agent, or Firm*—C. G. Mersereau; Nikolai & Mersereau, P.A.

(57) ABSTRACT

A voice coil motor device for positioning is disclosed. The voice coil motor device for positioning includes a fixed element, a moving element and a connector. The moving element is movably disposed on the fixed element. One end of the connector is connected with the fixed element and the other end of the connector is connected with the moving element. A piezoelectric element is disposed on the connector or deposed between the moving element and the fixed element. The piezoelectric element can be deformed with the movement of the moving element to generate a displacement signal of a moving element. The positioning of the voice coil motor can be achieved precisely basing on the judgment on the displacement signal of the moving element generated with the movement of the moving element by the piezoelectric element.

24 Claims, 8 Drawing Sheets

(A)

(B)

(A)

(B)

(A)

(B)

VOICE COIL MOTOR DEVICE FOR POSITIONING

BACKGROUND OF THE INVENTION

1. Field of the Invention

The present invention relates to a voice coil motor device for positioning, and more especially to a voice coil motor device for positioning used for driving lenses for micro image capturing modules.

2. Description of Related Art

Recently, more and more handheld devices have image capturing modules. With the increasing requirements of the handheld devices for better performance and smaller size, the image capturing modules are required to have high image quality and small size. To improve image quality heeds to increase pixels of images on one hand. The pixels of image capturing modules for the handheld devices are gradually increased to one million pixels, two million pixels, three million pixels, even four million pixels and five million pixels from 300 thousand of VGA levels. On the other hand, definition of captured images must be improved. So the image capturing modules of the handheld devices are developed from fixed focus to optical auto-focus like cameras, even optical zoom.

The operation principle of optical auto-focus is to moving a lens of an image capturing module properly according to a distance from an object so that an optical image of the object can be accurately focused on an image sensor to produce a clear image. Conventional methods for driving the lens of the image capturing module include a stepping motor driving method, a piezoelectric driving method, a voice coil motor (VCM) driving method and so on.

Generally, voice coil motor mechanisms are mainly formed by placing coils in magnetic circuits with permanent magnets. According to Fleming's left-hand rule, when the coils are electrified, they interact with the permanent magnets to produce electromagnetic thrusts to move supporting bases connected with the permanent magnets, thereby driving lens elements fixed on the supporting bases. Optical auto-focus and optical zoom can be achieved via adjusting electric currents flowing the coils.

However, besides using voice coil motors to drive lens elements to move axially, conventional image capturing modules further need positioning mechanisms for effectively positioning the lens elements to ensure that optical images of objects are accurately focused on image sensors of the image capturing modules to produce clear images.

Conventional positioning methods mainly determine the positions for moving lenses depending on judging if the light is occluded. Though the methods can effectively achieve the positioning, they need to use a plurality of elements to cooperate with each other. So the image capturing modules have too large size, which limits the development of miniaturizing application products. Additionally, the detection results of the light occlusion positioning methods aren't voltage signals, converters are needed to convert the detection results into voltage signals, which increases costs.

SUMMARY OF THE INVENTION

Accordingly, the present invention uses a piezoelectric element as a lens location mechanism basing on the limitation of configuration space and the positioning demand of a lens in an image capturing module. The piezoelectric element is deformed under pressure and generates a displacement signal of a moving element. The precise positioning of the lens can be achieved based on the displacement signal of the moving element.

A voice coil motor device for positioning of a first embodiment in accordance with the present invention includes a fixed element, a moving element and a connector. The moving element is movably disposed on the fixed element. The connector can produce slight bending deformation. One end of the connector is connected with the fixed element and the other end of the connector is connected with the moving element. A piezoelectric element is disposed on the connector. The piezoelectric element can be deformed with the deformation of the connector to generate a displacement signal of a moving element.

A voice coil motor device for positioning of a second embodiment in accordance with the present invention includes a fixed element, a moving element, a connector and a piezoelectric element. The moving element is movably disposed on the fixed element. The connector can produce slight bending deformation. One end of the connector is connected with the fixed element and the other end of the connector is connected with the moving element. One end of the piezoelectric element is connected with the connector and the other end of the piezoelectric element is connected with the fixed element. The piezoelectric element is pressed by the connector and the fixed element to produce deformation thereby generating a displacement signal of the moving element A voice coil motor device for positioning of a third embodiment in accordance with the present invention includes a fixed element, a moving element and a piezoelectric element. The moving element is movably disposed on the fixed element. One end of the piezoelectric element is connected with the moving element and the other end of the piezoelectric element is connected with the fixed element. The piezoelectric element is pressed by the moving element and the fixed element to produce deformation thereby generating a displacement signal of the moving element.

The piezoelectric elements disclosed in the first embodiment, the second embodiment and the third embodiment described above each includes a piezoelectric material and an output electrode for a piezoelectric signal. The precise positioning of the lens can be achieved basing on the judgment on the displacement signal of the moving element generated by the pressed and deformed piezoelectric element. Furthermore, the piezoelectric element is easy to be configured and assembled, so the manufacture isn't affected. Additionally, it is easy to configure other elements and beneficial to the development of miniaturizing application products.

To further understand features and technical contents of the present invention, please refer to the following detailed description and drawings related the present invention. However, the drawings are only to be used as references and explanations, not to limit the present invention.

DETAILED DESCRIPTION OF THE PREFERRED EMBODIMENTS

Figure 1:
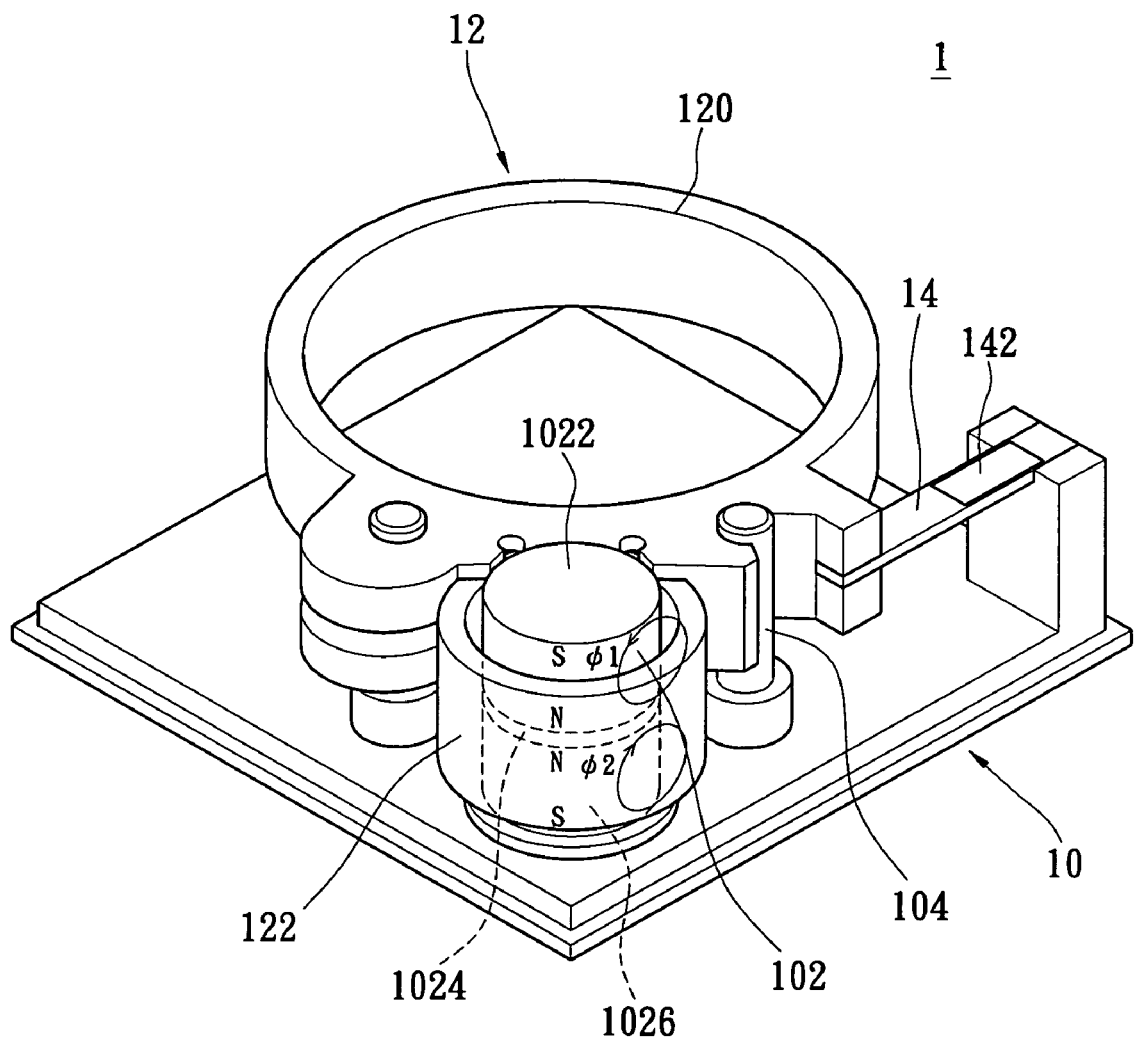
FIG. 1 is a schematic structure view of a voice coil motor device for positioning of a first embodiment of the present invention.

Please refer to FIG. 1 which is a schematic structure view of a voice coil motor device for positioning of a first embodiment of the present invention. The voice coil motor device for positioning 1 of the present invention includes a fixed element, 10, a moving element 12 and a connector 14. The moving element 12 is movably disposed on the fixed element 10 and includes a lens element 120 and a coil element 122. The lens element 120 has a lens (not shown) for capturing image. The fixed element 10 includes a magnet element 102. The electromagnetic field generated by the electrified coil element 122 and the magnetic field of the magnet element 102 interact to produce an electromagnetic thrust to drive the moving element 12.

Refer to FIG. 1 again, the coil element 122 is a hollow coil and the magnet element 102 includes a first magnet 1022 and a magnetic conductive element 1024. The first magnet 1022 is fixed on the lens element 120 and surrounds the coil element 122 with a sliding clearance therebetween. The magnetic conductive element 1024 has a first combining face (not shown) magnetically combined with the first magnet 1022 and a second combining face (not shown). The present invention further includes a second magnet 1026 magnetically combined with the second combining face of the magnetic conductive element 1024 for enhancing the intensity of the magnetic field of the magnet element 102.

Refer to FIG. 1 again, the magnetic field Φ1 starts from the north pole of the lower surface of the first magnet 1022 and is absorbed and concentrated by the magnetic conductive element 1024. Then the magnetic conductive element 1024 guides the magnetic field Φ1 to turn to the gap formed by the sliding clearance, pass through the gap and the coil element 122 and return to the south pole of the upper surface of the first magnet 1022, thereby forming a closed magnetic circuit. When passing through the coil element 122, the magnetic field Φ1 interacts with the electromagnetic field generated by the electrified coil element 122 to produce the electromagnetic thrust.

The magnetic conductive element 1024 absorbs and concentrates the magnetic field Φ1 of the first magnet 1022 and guides the absorbed and concentrated magnetic field Φ1 to effectively pass through the coil element 122, thereby avoiding the leak of the magnetic field Φ1 of the first magnet 1022 and ensuring that the driving force is enough to drive the lens to move.

Refer to FIG. 1 again, the present invention further magnetically combines the second magnet 1026 with the second combining face of the magnetic conductive element 1024. The first magnet 1022 and the second magnet 1026 are combined with the magnetic conductive element 1024 in the same polarity and magnetism. The magnetic conductive element 1024 absorbs the magnetic field from the first magnet 1022 and the second magnet 1026 and guides the magnetic field to pass through the coil element 122 and interact with the electromagnetic field generated by the electrified coil element 122 to produce enough electromagnetic thrust to drive the moving element 12.

Simultaneously, the magnetic field of the first magnet 1022 and the second magnet 1026, which are absorbed by the magnetic conductive element 1024, pass through the coil element 122 and the clearance to interact with a fixed shaft 104 with magnetic conductivity of the fixed element 10 to produce flux linkage, thereby producing enough preliminary magnetic force, so that the fixed shaft 104 with magnetic conductivity slidably contacts with a support surface of the lens element 120 more close to achieve the sliding movement without deviation.

Furthermore, according to Fleming's left-hand rule, in the first embodiment, the coil element 122 of the moving element 12 and the magnet element 102 of the fixed element 10 may be interchanged, which can also produce an electromagnetic thrust to drive the moving element 12 basing on the interaction of the magnetic field. The magnet element 102 described above further may be replaced by a magnetic conductive part. The electromagnetic field generated by the electrified coil element 122 passes through the magnetic conductive part and then produces an electromagnetic thrust to drive the moving element 12.

Refer to FIG. 1 again, the connector 14 of the voice coil motor device for positioning 1 of the present invention is an element which can produce slight bending deformation. A piezoelectric element 142 is disposed on the connector 14. One end of the connector 14 is connected with the fixed element 10 and the other end thereof is connected with the moving element 12. The piezoelectric element 142 may produce deformation with the deformation of the connection and generate a displacement signal (not shown) of the moving element. The piezoelectric element 142 is partially or entirely attached to the connector 14 and includes a piezoelectric material and an output electrode for a piezoelectric signal (not shown).

Refer to FIG. 1 again, the fixed element 10 of the voice coil motor device for positioning 1 of the present invention includes one or more fixed shafts 104 used for guiding the moving element 12. The fixed shafts 104 are fixed on the fixed element 10 and located on the inner edge of the circular-hole-shaped or open-arc-shaped support surface of the lens element 120. The fixed shafts 104 are used for guiding the moving element 12 so that the moving element 12 can axially move on the fixed element 10. After the coil element 122 is electrified, the coil element 122 generates an electromagnetic field and the electromagnetic field interacts with the magnetic field of the magnet element 102 to produce an electromagnetic thrust for pushing the moving element 12 to move axially. Besides using the fixed shaft 104 for guiding the moving element 12 to move on the fixed element 10, the embodiment may also use a sliding surface (not shown) formed on the fixed element 10 for guiding the moving element 12.

Figure 2:
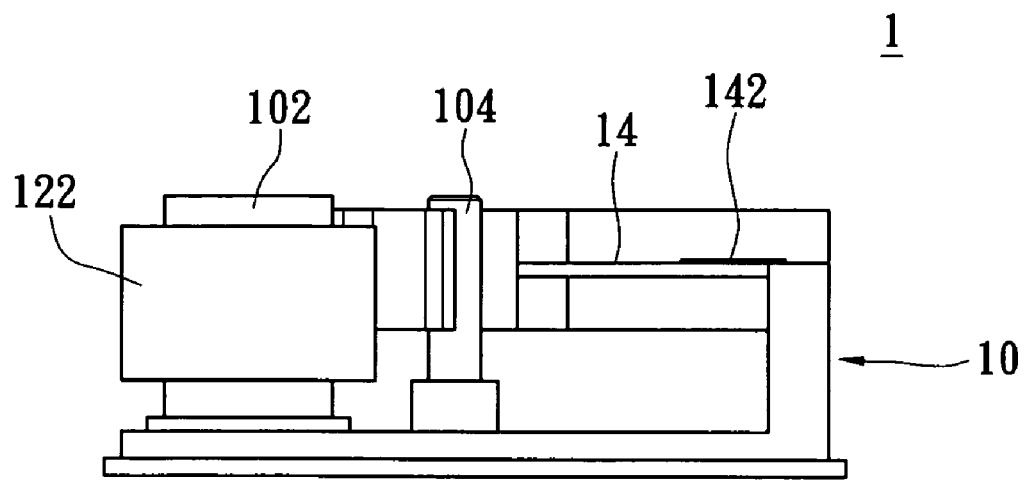
FIG. 2 is a schematic action view of the first embodiment of the present invention.
Figure 2:
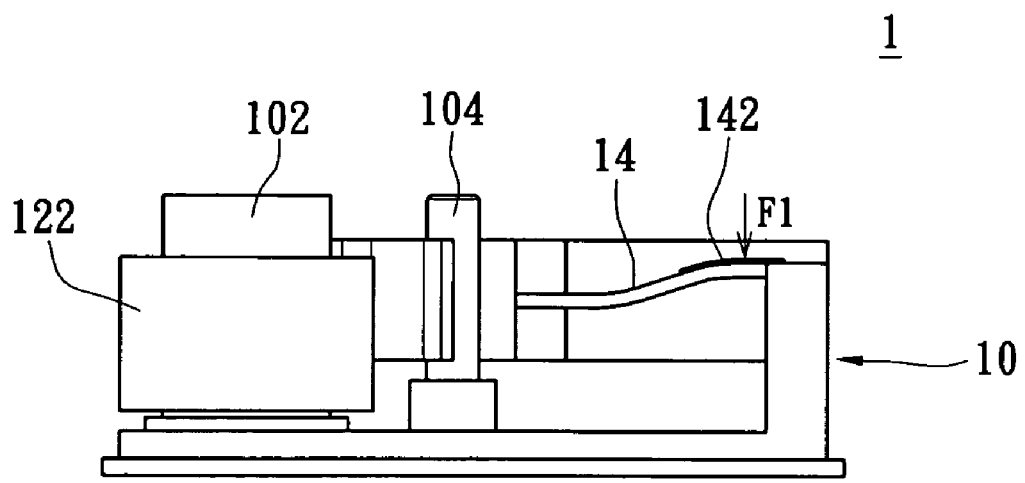

Cooperating with FIG. 1, refer to FIG. 2 illustrating the actions of the first embodiment of the present invention. In the action (A) of FIG. 2, the voice coil motor device for positioning 1 of the present invention is in an initial action state, at the same time, the coil element 122 isn't electrified, so there is no electromagnetic field generated to interact with the magnetic field of the magnet element 102. The connector 14 of the present invention doesn't produce bending deformation, so the displacement signal of the moving element generated by the output electrode of the piezoelectric element 142 is zero.

However, in the action (B) of FIG. 2, the coil element 122 of the voice coil motor device for positioning 1 of the present invention is electrified to generate the electromagnetic field. The electromagnetic field interacts with the magnetic field of the magnet element 102 to produce an electromagnetic thrust F1 for pushing the moving element 12 to move axially. At this time, the connector 14 connected with the fixed element 10 and the moving element 12 produces bending deformation and the piezoelectric element 142 attached on the connector 14 also produces bending deformation thereby sending out a displacement signal of the moving element via the output electrode. Basing on the judgment on the displacement signal of the moving element, the electromagnetic thrust F1 can be controlled precisely, thereby achieving the positioning of the moving element 12 which moves axially.

Figure 3:
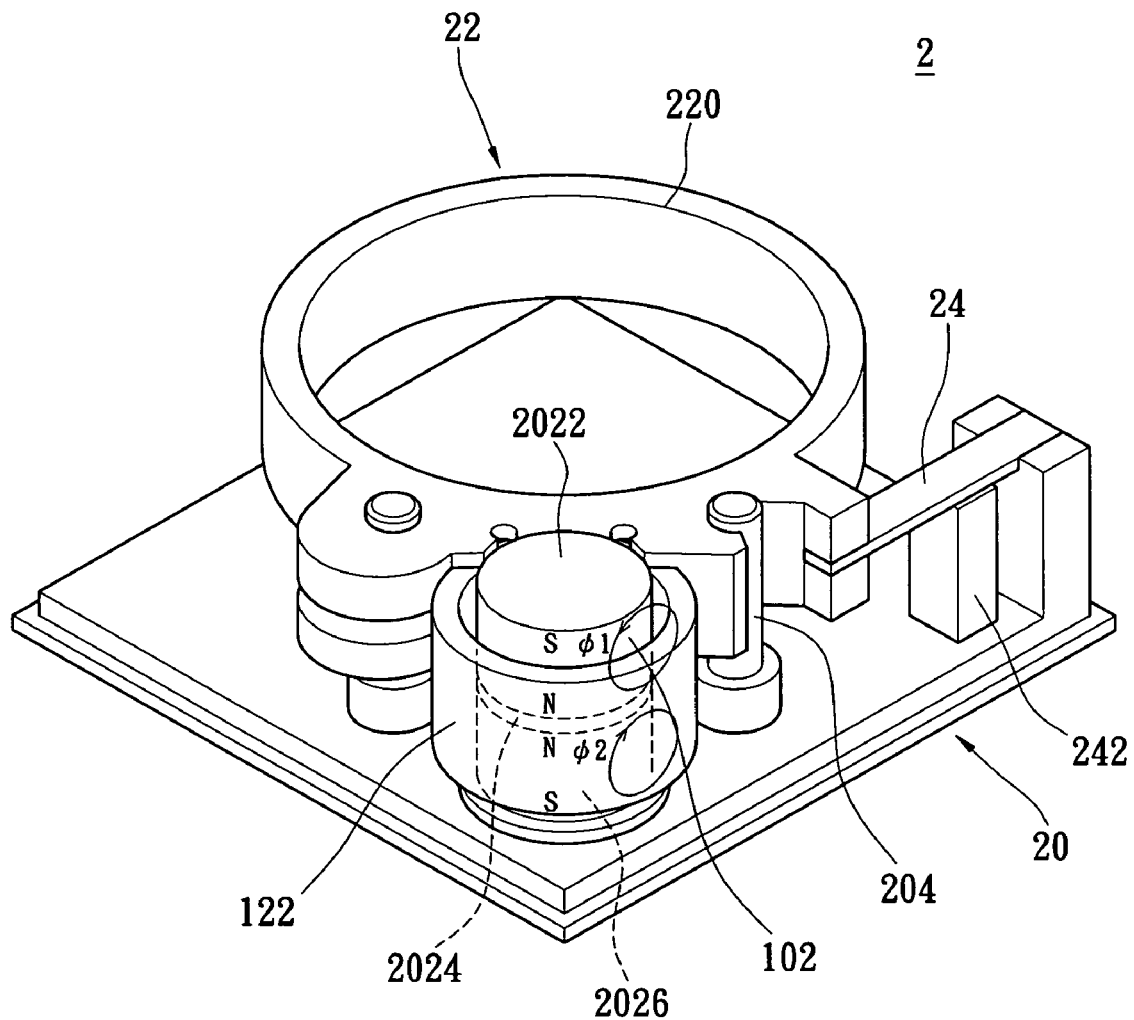
FIG. 3 is a schematic structure view of a voice coil motor device for positioning of a second embodiment of the present invention.

Please refer to FIG. 3 which is a schematic structure view of a voice coil motor device for positioning of a second embodiment of the present invention. The voice coil motor device for positioning 2 of the present invention includes a fixed element 20, a moving element 22, a connector 24 and a piezoelectric element 142. The moving element 22 is movably disposed on the fixed element 20 and includes a lens element 220 and a coil element 222. The lens element 220 has a lens (not shown) for capturing image. The fixed element 20 includes a magnet element 202. The electromagnetic field generated by the coil element 222 electrified and the magnetic field of the magnet element 202 interact to produce an electromagnetic thrust to drive the moving element 22.

Furthermore, according to Fleming's left-hand rule, in the second embodiment, the coil element 222 of the moving element 22 and the magnet element 202 of the fixed element 20 may be interchanged, which can also produce ah electromagnetic thrust to drive the moving element 22 basing on the interaction of the magnetic field. The magnet element 202 described above may be replaced by a magnetic conductive part. The electromagnetic field generated by the electrified coil element 222 may pass through the magnetic conductive part. The coil element 222 and the magnet element 202 disclosed in the second embodiment have the same technical features and operation principles with those disclosed in the first embodiment, so the detailed descriptions are omitted.

Refer to FIG. 3 again, the connector 24 of the voice coil motor device for positioning 2 of the present invention is an element which can produce slight bending deformation. One end of the connector 14, is connected with the fixed element 20 and the other end thereof is connected with the moving element 22. One end of the piezoelectric element 242 is connected with the connector 24 and the other end thereof is connected with the fixed element 20. When pressed by the bent connector 24, the piezoelectric element 242 produces deformation and generates a displacement signal (not shown) of the moving element for output. The piezoelectric element 242 described above includes a piezoelectric material and an output electrode for a piezoelectric signal (not shown).

Refer to FIG. 3, the fixed element 20 of the voice coil motor device for positioning 2 of the present invention further includes one or more fixed shafts 204 used for guiding the moving element 22. The fixed shafts 204 are fixed on the fixed element 10 and located on an inner edge of a circular-hole-shaped or open-arc-shaped support surface of the lens element 220. The fixed shafts 204 are used for guiding the moving element 22 so that the moving clement 22 can axially move on the fixed element 20. After the coil element 222 is electrified, the coil element 222 generates the electromagnetic field and the electromagnetic field and the magnetic field of the magnet element 202 interacts to produce the electromagnetic thrust for pushing the moving element 22 to move axially. Besides using the fixed shaft 204 for guiding the moving element 22 to move on the fixed element 20, the embodiment may also use a sliding surface (not shown) formed on the fixed element 20 for guiding the moving element 22.

Figure 4:
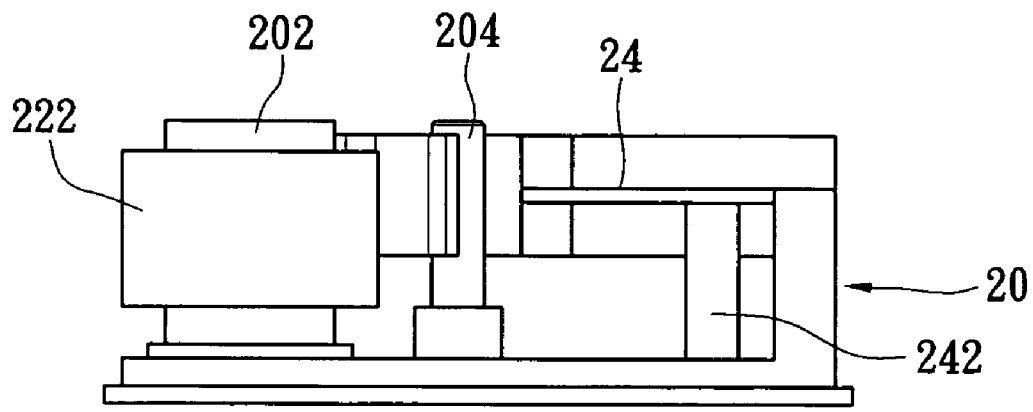
FIG. 4 is a schematic action view of the second embodiment of the present invention.
Figure 4:
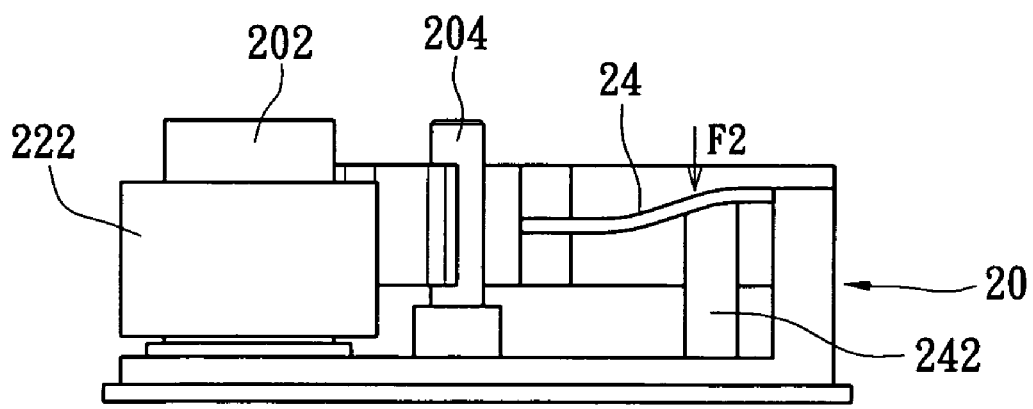

Cooperating with FIG. 3, refer to FIG. 4 illustrating the actions of the second embodiment of the present invention. In the action (A) of FIG. 4, the voice coil motor device for positioning 2 of the present invention is in an initial action state, at this time, the coil element 222 isn't electrified, so there is no electromagnetic field generated to interact with the magnetic field of the magnet element 202. The connector 24 of the present invention doesn't produce bending deformation, so it doesn't press the piezoelectric element 242 and the displacement signal of the moving element generated by the output electrode of the piezoelectric element 242 is zero.

However, in the action (B) of FIG. 4, the coil element 222 of the voice coil motor device for positioning 2 of the present invention is electrified to generate the electromagnetic field. The electromagnetic field interacts with the magnetic field of the magnet element 202 to produce an electromagnetic thrust F2 for pushing the moving element 22 to move axially. At this time, the connector 24 connected with the fixed element 20 and the moving element 22 produces bending deformation and the piezoelectric element 242 connected with the connector 24 is pressed to produce bending deformation thereby sending out a displacement signal of the moving element via the output electrode. Basing on the judgment on the displacement signal of the moving element, the electromagnetic thrust F2 can be controlled precisely, thereby achieving the positioning of the moving element 22 which moves axially.

Figure 5:
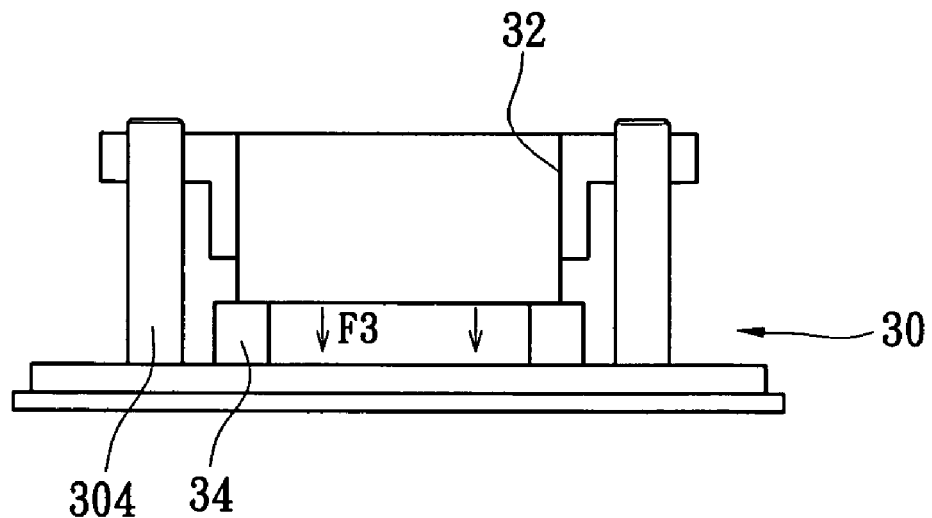
FIG. 5 is a schematic structure view of a voice coil motor device for positioning of a third embodiment of the present invention.

Please refer to FIG. 5 which is a schematic structure view of a voice coil motor device for positioning of a third embodiment of the present invention. The voice coil motor device for positioning 3 of the present invention includes a fixed element 30, a moving element 32 and a piezoelectric element 34. The fixed element 30 further includes one or more fixed shafts 304 which are used for guiding the moving element 32 so that the moving element 32 can axially move on the fixed element 30. The moving element 32 includes a lens element (not labeled) for capturing image and a coil element (not labeled). The fixed element 30 includes a coil element (not labeled). After the coil element is electrified, the coil element generates the electromagnetic field, and the electromagnetic field and the magnetic field of the magnet element of the moving element 32 interact to produce an electromagnetic thrust F3 to drive the moving element 32.

Furthermore, according to Fleming's left-hand rule, in the third embodiment, the magnet element of the moving element 32 and the coil element of the fixed element 30 may be interchanged, which can also produce the electromagnetic thrust F3 to drive the moving element 32 basing on the interaction of the magnetic field. The magnet element described above may be replaced by a magnetic conductive part. The electromagnetic field generated by the electrified coil element may pass through the magnetic conductive part to produce the electromagnetic thrust to drive the moving element 32. The coil element and the magnet element disclosed in the third embodiment have the same technical features and operation principles with those disclosed in the first embodiment, so the detailed descriptions are omitted.

Refer to FIG. 5 again, the piezoelectric element 34 of the voice coil motor device for positioning 3 of the present invention has one end connected with the moving element 32 and the other end connected with the fixed element 30. The piezoelectric element 34 is pressed by the moving element 32 to produce bending deformation thereby sending out a displacement signal of the moving element. The piezoelectric element 34 described above includes a piezoelectric material and an output electrode for a piezoelectric signal (not shown).

Figure 6:
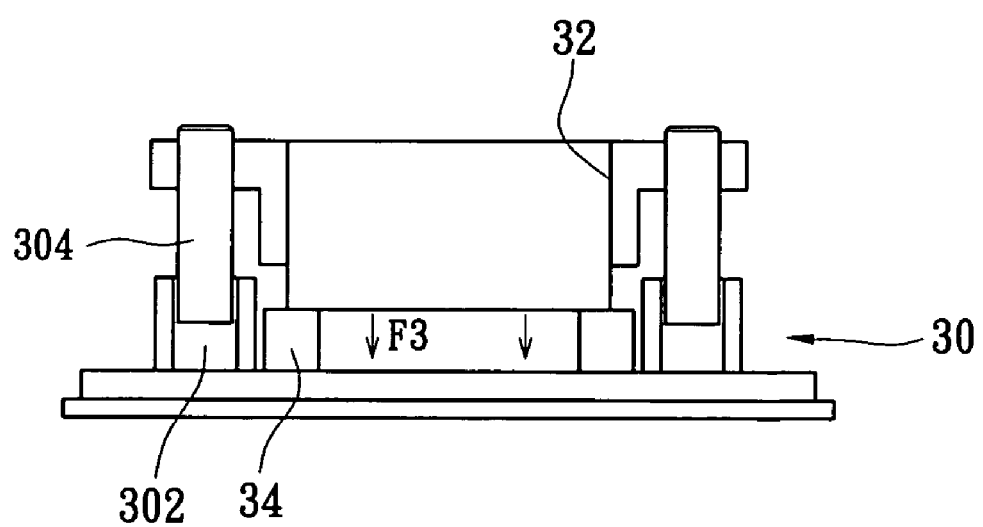
FIG. 6 is a schematic structure view of a voice coil motor device for positioning of a fourth embodiment of the present invention.

Cooperating with FIG. 5, refer to FIG. 6 which is a schematic structure view of a voice coil motor device for positioning of a fourth embodiment of the present invention. The same numerals indicate the same elements in the fourth embodiment and the third embodiment. The fourth embodiment has the same electric circuit, operation principles of magnetic circuit and efficacy with the third embodiment. Comparing with the third embodiment, the main difference is that the fixed shafts 304 of the fourth embodiment are fixedly connected with the moving element 32 and respectively cooperate with one or more sliding holes 302 in the fixed element 30 for guiding the moving element 32.

Figure 7:
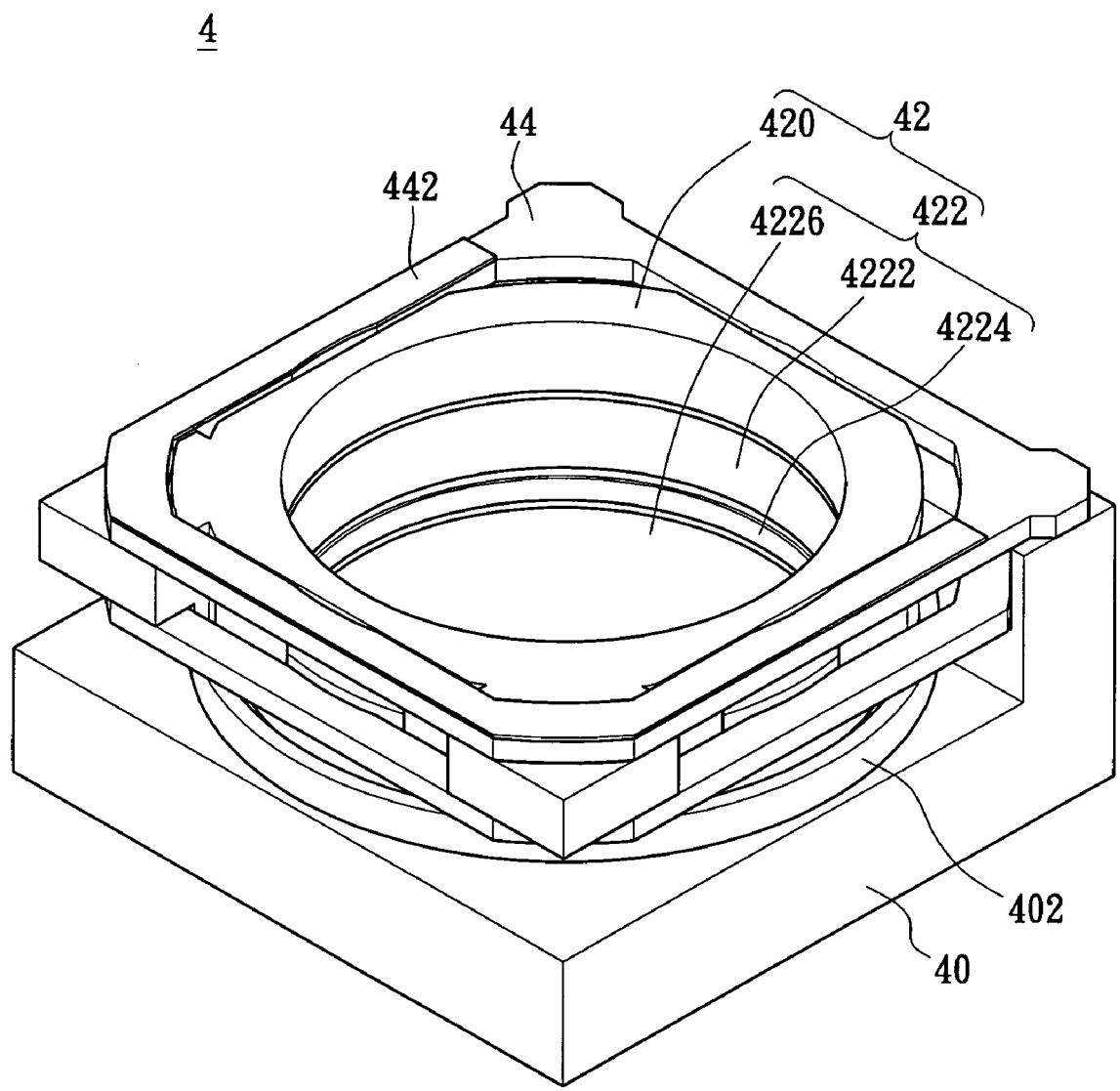
FIG. 7 is a schematic structure view of a voice coil motor device for positioning of a fifth embodiment of the present invention.

Please refer to FIG. 7 which is a schematic structure view of a voice coil motor device for positioning of a fifth embodiment of the present invention. The voice coil motor device for positioning 4 includes a fixed element 40, a moving element 42 and a connector 44. The moving element 42 is movably disposed on the fixed element 40 and includes a lens element 420 and a magnet element 422. The magnet element 422 includes a first magnet 4222, a magnetic conductive element 4224 and a second magnet 4226. The lens element 420 has a lens (not shown) for capturing image. The fixed element 40 includes a coil element 402. The electromagnetic field generated by the electrified coil element 402 and the magnetic field of the magnet element 422 described above interact to produce an electromagnetic thrust to drive the moving element 42.

The magnet element 422 described above may be replaced by a magnetic conductive part. The electromagnetic field generated by the electrified coil element 402 may pass through the magnetic conductive part and then produce an electromagnetic thrust to drive the moving element 42. The coil element 402 and the magnet element 422 disclosed in the fifth embodiment have the same technical features and operation principles with those disclosed in the first embodiment, so the detailed descriptions are omitted.

Refer to FIG. 7 again, the connector 44 of the voice coil motor device for positioning 4 of the present invention is an element which can produce slight bending deformation. A piezoelectric element 442 is disposed on the connector 44. The connector 44 is connected with the fixed element 40 and the moving element 42. The piezoelectric element 442 produces deformation under pressure and generates a displacement signal (not shown) of the moving element. The piezoelectric element 442 is partially or entirely attached to the connector 44 and includes a piezoelectric material and an output electrode for a piezoelectric signal (not shown).

Figure 8:
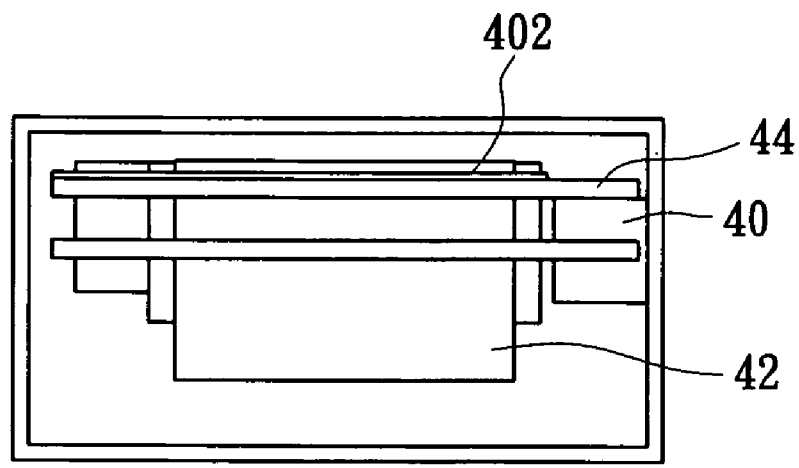
FIG. 8 is a schematic action view of the fifth embodiment of the present invention.
Figure 8:
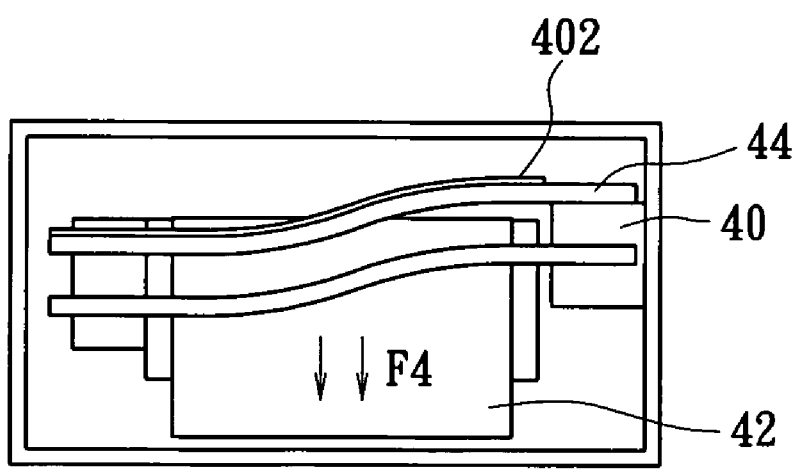

Cooperating with FIG. 7, refer to FIG. 8 illustrating, the actions of the fifth embodiment of the present invention. In the action (A) of FIG. 8, the voice coil motor device for positioning 4 of the present invention is in an initial action state, at this time, the coil element 402 isn't electrified, so there is no electromagnetic field generated to interact with the magnetic field of the magnet element 422. The connector 44 of the present invention doesn't produce bending deformation, so the displacement signal of the moving element generated by the output electrode of the piezoelectric element 442 is zero.

However, in the action (B) of FIG. 8, the coil element 402 of the voice coil motor device for positioning 4 of the present invention is electrified to generate an electromagnetic field. The electromagnetic field interacts with the magnetic field of the magnet element 422 to produce an electromagnetic thrust F4 for pushing the moving element 42 to move axially. At this time, the connector 44 connected with the fixed element 40 and the moving element 42 produces bending deformation and the piezoelectric element 442 attached to the connector 44 also produces bending deformation thereby sending out a displacement signal of the moving element via the output electrode. Basing on the judgment on the displacement signal of the moving element, the electromagnetic thrust F4 can be controlled precisely, thereby achieving the positioning of the moving element 22 which moves axially. Consequently, the voice coil motor device for positioning according to the present invention uses the piezoelectric element including the piezoelectric material and the output electrode to attain the displacement signal of the moving element of the voice coil motor. The positioning of the voice coil motor can be achieved precisely basing on the judgment on the displacement signal of the moving element generated by the pressed and deformed piezoelectric element. Furthermore, the piezoelectric element is easy to be configured and assembled, so the manufacture isn't affected. Additionally, it is easy to configure other elements and beneficial to the development of miniaturizing application products.

Figure 9:
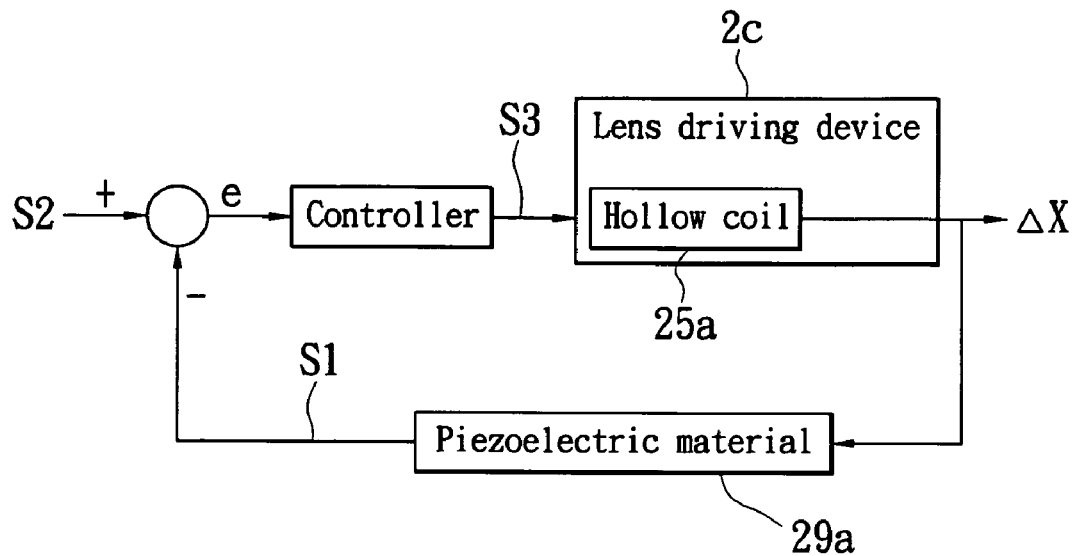
FIG. 9 is a schematic view of a first feedback control method for a piezoelectric signal of the present invention.
Figure 10:
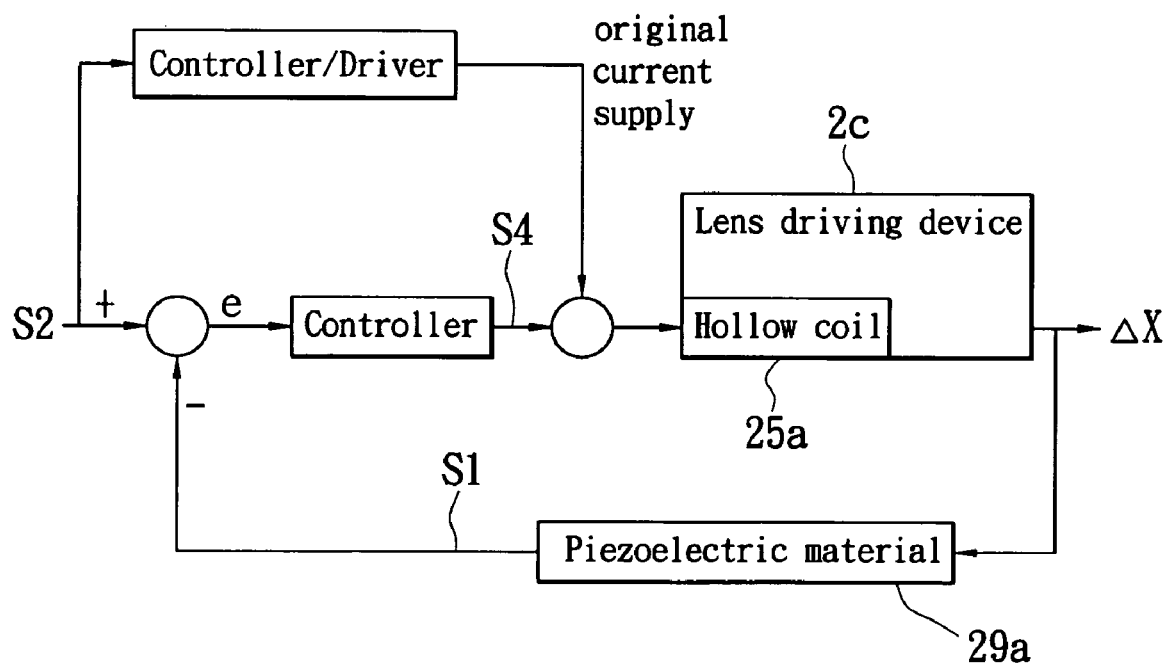
FIG. 10 is a schematic view of a second feedback control method for a piezoelectric signal of the present invention.

With regard to a feedback control method of the piezoelectric signal of the piezoelectric material, please refer to FIG. 9 and FIG. 10 respectively illustrating a first feedback control method of the piezoelectric signal according to the present invention and a second feedback control method of the piezoelectric signal according to the present invention. As shown in FIG. 9, after comparing with an object displacement command signal S2, a piezoelectric signal S1 of the piezoelectric material 29a is calculated by a controller C to generate a coil current supply signal S3 for a hollow coil 25a of a lens driving device 2c, thereby achieving precise positioning.

As shown in FIG. 10, after comparing with an object displacement command signal S2, a piezoelectric signal S1 of the piezoelectric material 29a is calculated by a controller C to generate a coil current correction value S4 for a hollow coil 25a of a lens driving device 2c, thereby achieving precise positioning.

In other words, the present invention can generate the coil current supply signal and the coil current correction value for the hollow coil 25a via the piezoelectric material 29a which can be pressed and deformed to generate a signal between the second magnet 27a and the fixed element and the calculation of the controller C, thereby achieving the precise positioning.

Accordingly, the present invention is fully nonobvious, and thus we apply for a patent for the present invention in accordance to Patent Law. Please examine and grant the present invention to guarantee inventors' rights. If examiners have any question about the present invention, please give us the instructions by means of letter.

What are disclosed above are only the specification and the drawings of the preferred embodiments of the present invention and it is therefore not intended that the present invention be limited to the particular embodiments disclosed. It will be understood by those skilled in the art that various equivalent changes may be made depending on the specification and the drawings of the present invention without departing from the scope of the present invention.

What is claimed is:

1. A voice coil motor device for positioning, comprising:
a fixed element, including a coil element;
a moving element, including a lens element and a magnet element, and movably disposed on the fixed element; and a connector, which can produce a slight bending deformation, a piezoelectric element disposed on the connector, and one end of the connector connected with the fixed element and the other end of the connector connected with the moving element, wherein the piezoelectric element can generate a signal corresponding to the displacement of the moving element through the deformation of the connector, and the piezoelectric element is partially or entirely attached to the connector and includes a piezoelectric material and an output electrode for a piezoelectric signal.

2. The voice coil motor device for positioning as claimed in claim 1, wherein after comparing with an object displacement command signal, a piezoelectric signal of the piezoelectric material is calculated by a controller to generate a coil current supply signal or a coil current correction value for precise positioning of the moving element.

3. The voice coil motor device for positioning as claimed in claim 1, wherein the fixed element includes one or more fixed shafts for guiding the moving element; or the fixed element includes one or more sliding surfaces for connecting the fixed element with the moving element for guiding the moving element.

4. The voice coil motor device for positioning as claimed in claim 1, wherein the coil element is a hollow coil, and the magnet element includes a first magnet, and the first magnet is fixed on the lens element and is received in or surrounds the hollow coil with a sliding clearance therebetween, and the electromagnetic field generated by the electrified coil element and the magnetic field of the magnet element interact to produce an electromagnetic thrust to drive the moving element.

5. The voice coil motor device for positioning as claimed in claim 4, wherein the magnet element further includes a magnetic conductive element, and the magnetic conductive element has a first combining face and a second combining face, the first combining face magnetically combined with the first magnet.

6. The voice coil motor device for positioning as claimed in claim 5, wherein the magnet element further includes a second magnet magnetically combined with the second combining face of the magnetic conductive element, and the first magnet and the second magnet are combined with the magnetic conductive element in the same polarity and magnetism.

7. A voice coil motor device for positioning, comprising:
a fixed element, including a coil element;
a moving element, including a lens element and a magnet element, and movably disposed on the fixed element; and
a connector, which can be subject to a slight bending deformation, one end of the connector being connected to the fixed element and the other end of the connector being connected to the moving element; and
a piezoelectric element, of which one end is connected with the connector or connected with the moving element and the other end is connected with the fixed element, wherein the piezoelectric element is pressed by the connector or the moving element to produce deformation thereby generating a displacement signal of the moving element, and the piezoelectric element includes a piezoelectric material and an output electrode for a piezoelectric signal.

8. The voice coil motor device for positioning as claimed in claim 7, wherein after comparing with an object displacement command signal, a piezoelectric signal of the piezoelectric material is calculated by a controller to generate a coil current supply signal or a coil current correction value for precise positioning of the moving element.

9. The voice coil motor device for positioning as claimed in claim 7, wherein the fixed element includes one or more fixed shafts for guiding the moving element; or, the fixed element includes one or more sliding surfaces for connecting the fixed element with the moving element for guiding the moving element.

10. The voice coil motor device for positioning as claimed in claim 7, wherein the coil element is a hollow coil, and the magnet element includes a first magnet, and the first magnet is fixed on the lens element and is received in or surrounds the hollow coil with a sliding clearance therebetween, and the magnetic field of the magnet element and an electromagnetic field generated by the electrified coil element interact to produce an electromagnetic thrust to drive the moving element.

11. The voice coil motor device for positioning as claimed in claim 10, wherein the magnet element further includes a magnetic conductive element, and the magnetic conductive element has a first combining face and a second combining face, the first combining face magnetically combined with the first magnet.

12. The voice coil motor device for positioning as claimed in claim 11, wherein the magnet element further includes a second magnet magnetically combined with the second combining face of the magnetic conductive element, and the first magnet and the second magnet are combined with the magnetic conductive element in the same polarity and magnetism.

13. A voice coil motor device for positioning, comprising:
a fixed element, including a magnet element;
a moving element, including a lens element and a coil element, and movably disposed on the fixed element; and
a connector, which can produce a slight bending deformation, a piezoelectric element disposed on the connector, and one end of the connector connected with the fixed element and the other end of the connector connected with the moving element, wherein the piezoelectric element can generate a signal corresponding to the displacement of the moving element through the deformation of the connector, and the piezoelectric element is partially or entirely attached to the connector and includes a piezoelectric material and an output electrode for a piezoelectric signal.

14. The voice coil motor device for positioning as claimed in claim 13, wherein after comparing with an object displacement command signal, a piezoelectric signal of the piezoelectric material is calculated by a controller to generate a coil current supply signal or a coil current correction value for precise positioning of the moving element.

15. The voice coil motor device for positioning as claimed in claim 13, wherein the fixed element includes one or more fixed shafts for guiding the moving element; or the fixed element includes one or more sliding surfaces for connecting the fixed element with the moving element for guiding the moving element.

16. The voice coil motor device for positioning as claimed in claim 13, wherein the coil element is a hollow coil, and the magnet element includes a first magnet, and the first magnet is fixed on the lens element and is received in or surrounds the hollow coil with a sliding clearance there between, and the magnetic field of the magnet element and the electromagnetic field generated by the electrified coil element interact to produce an electromagnetic thrust to drive the moving clement.

17. The voice coil motor device for positioning as claimed in claim 16, wherein the magnet element further includes a magnetic conductive clement, and the magnetic conductive element has a first combining face and a second combining face, the first combining face magnetically combined with the first magnet.

18. The voice coil motor device for positioning as claimed in claim 17, wherein the magnet element further includes a second magnet magnetically combined with the second combining face of the magnetic conductive element, and the first magnet and the second magnet are combined with the magnetic conductive element in the same polarity and magnetism.

19. A voice coil motor device for positioning, comprising:
a fixed element including a magnet element;
a moving element, including a lens element and a coil element, and movably disposed on the fixed element; and
a connector, which can be subject to a slight bending deformation, one end of the connector being connected to the fixed element and the other end of the connector being connected to the moving element; and
a piezoelectric element, of which one end is connected with the connector or connected with the moving element and the other end is connected with the fixed element, wherein the piezoelectric element is pressed by the connector or the moving element to produce deformation thereby generating a displacement signal of the moving element, and the piezoelectric clement includes a piezoelectric material and an output electrode for a piezoelectric signal.

20. The voice coil motor device for positioning as claimed in claim 19, wherein after comparing with an object displacement command signal, a piezoelectric signal of the piezoelectric material is calculated by a controller to generate a coil current supply signal or a coil current correction value for precise positioning of the moving element.

21. The voice coil motor device for positioning as claimed in claim 19, wherein the fixed element includes one or more fixed shafts for guiding the moving element; or, the fixed element includes one or more sliding surfaces for connecting the fixed element with the moving element for guiding the moving element.

22. The voice coil motor device for positioning as claimed in claim 19, wherein the coil element is a hollow coil, and the magnet element includes a first magnet, and the first magnet is fixed on the lens element and is received in or surrounds the hollow coil with a sliding clearance there between, and the magnetic field of the magnet element and the electromagnetic field generated by the electrified coil element interact to produce an electromagnetic thrust to drive the moving element.

23. The voice coil motor device for positioning as claimed in claim 22, wherein the magnet element further includes a magnetic conductive element, and the magnetic conductive element has a first combining face and a second combining face, the first combining face magnetically combined with the first magnet.

24. The voice coil motor device for positioning as claimed in claim 23, wherein the magnet element further includes a second magnet magnetically combined with the second combining face of the magnetic conductive element, and the first magnet and the second magnet are combined with the magnetic conductive element in the same polarity and magnetism.

* * * * *